United States Patent
Chang et al.

(10) Patent No.: US 12,351,169 B2
(45) Date of Patent: Jul. 8, 2025

(54) ADAPTIVE CRUISE CONTROL SYSTEM AND ADAPTIVE CRUISE CONTROL METHOD SUPPORTING TRAFFIC LIGHT RECOGNITION

(71) Applicant: GREAT WALL MOTOR COMPANY LIMITED, Hebei (CN)

(72) Inventors: Junjie Chang, Baoding (CN); Yuanyuan Zhang, Baoding (CN); Pu Li, Baoding (CN); Longbao Zhen, Baoding (CN); Kai Zhang, Baoding (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 560 days.

(21) Appl. No.: 17/709,816

(22) Filed: Mar. 31, 2022

(65) Prior Publication Data
US 2022/0219689 A1 Jul. 14, 2022

Related U.S. Application Data

(63) Continuation-in-part of application No. PCT/CN2020/128695, filed on Nov. 13, 2020.

(30) Foreign Application Priority Data

Dec. 14, 2019 (CN) .......................... 201911115160.X

(51) Int. Cl.
*B60W 30/14* (2006.01)
*B60W 30/08* (2012.01)
(Continued)

(52) U.S. Cl.
CPC ............ *B60W 30/14* (2013.01); *B60W 30/08* (2013.01); *G06V 20/584* (2022.01); *G08G 1/095* (2013.01); *B60W 2510/18* (2013.01)

(58) Field of Classification Search
CPC ................. B60W 30/14; B60W 30/08; B60W 2510/18; B60W 2420/403;
(Continued)

(56) References Cited

U.S. PATENT DOCUMENTS 8,478,500 B1 * 7/2013 Vahidi ............. G08G 1/096716
701/93
11,192,549 B2 * 12/2021 Lanfranco ............ G06V 20/584
(Continued)

FOREIGN PATENT DOCUMENTS

CN       106688025 A      5/2017
CN       206900370 U      1/2018
(Continued)

OTHER PUBLICATIONS

International Application No. PCT/CN2020/128695 International Search Report and Written Opinion with English Machine Translation mailed Feb. 18, 2021, 11 pgs.
(Continued)

*Primary Examiner* — Peter D Nolan
*Assistant Examiner* — Demetra R Smith-Stewart
(74) *Attorney, Agent, or Firm* — Fredrikson & Byron, P.A.

(57) ABSTRACT

An adaptive cruise control system and an adaptive cruise control method supporting traffic light recognition are provided. The adaptive cruise control system in the present disclosure includes: a wireless receiver adaptive with a wireless transmitter of each traffic light on a current lane and configured to receive first traffic light state information about the traffic light on the current lane sent by the wireless transmitter; and a main controller being in communication with the wireless receiver and configured to obtain the first traffic light state information received from the wireless receiver, and perform a stop control or adaptive cruise control based on the first traffic light state information. By implementing the adaptive cruise control method, an adaptive cruise control for avoiding a driver from violation of traffic light is further realized based on the state information of the traffic lights, so that a safety of driving can be improved.

11 Claims, 5 Drawing Sheets

(51) Int. Cl.
  *G06V 20/58* (2022.01)
  *G08G 1/095* (2006.01)
(58) Field of Classification Search
  CPC ....... B60W 2420/408; B60W 2552/53; B60W 30/18154; B60W 2540/20; B60W 30/143; B60W 2556/45; B60W 2556/50; B60W 30/181; B60W 40/04; B60W 60/0016; B60W 2050/0064; B60W 2520/04; B60W 2555/60; G06V 20/584; G06V 10/56; G08G 1/095; G01S 13/931; G01S 13/867; G01S 2013/9316; H04N 23/00
  See application file for complete search history.

(56) References Cited

U.S. PATENT DOCUMENTS

| | | |
|---|---|---|
| 2007/0197231 A1 | 8/2007 | Lin |
| 2016/0257288 A1* | 9/2016 | Miller ............. B60W 30/18109 |
| 2016/0318490 A1* | 11/2016 | Ben Shalom ...... B60K 31/0008 |
| 2018/0136651 A1 | 5/2018 | Levinson et al. |
| 2018/0273033 A1 | 9/2018 | Johnson et al. |

FOREIGN PATENT DOCUMENTS

| | | |
|---|---|---|
| CN | 110979323 A | 4/2020 |
| JP | 2019027996 A | 2/2019 |
| JP | 2019079398 A | 5/2019 |
| JP | 2019084924 A | 6/2019 |
| KR | 1020170030816 A | 3/2017 |
| KR | 1020180031892 A | 3/2018 |
| RU | 2659341 C2 | 6/2018 |
| WO | 2010143264 A1 | 12/2010 |
| WO | 2016018636 A1 | 2/2016 |
| WO | 2019014424 A1 | 1/2019 |
| WO | 2019040024 A1 | 2/2019 |
| WO | 2019245501 A2 | 12/2019 |
| WO | 2020040024 A1 | 2/2020 |

OTHER PUBLICATIONS

Ziegler, Julius, et al., "Making Bertha Drive-An Autonomous Journey on a Historic Route", IEEE intelligent Transportation Systems Magazine, Apr. 23, 2014, pp. 8-20.

* cited by examiner

ADAPTIVE CRUISE CONTROL SYSTEM AND ADAPTIVE CRUISE CONTROL METHOD SUPPORTING TRAFFIC LIGHT RECOGNITION

CROSS REFERENCE TO RELATED APPLICATION

This application is a continuation-in-part of PCT international patent application No. PCT/CN2020/128695, filed on Nov. 13, 2020, which claims priority to Chinese patent application No. 201911115160.X filed on Nov. 14, 2019 and entitled "adaptive cruise control system and adaptive cruise control method supporting traffic light recognition", the disclosure of which is incorporated herein by reference in entirety.

TECHNICAL FIELD

The present disclosure relates to technologies of automatic drive and intelligent transportation system, and particularly, to an adaptive cruise control system supporting traffic light recognition and an adaptive cruise control method supporting traffic light recognition.

BACKGROUND

With the popularity of advanced driving assistance systems, it is safer and more convenient for people to have a travel by driving vehicles, and driving behavior is more reasonable and standard. As an important component of advanced driving assistance system, adaptive cruise control (Adaptive Cruise Control, ACC) system enables a vehicle to intelligently select to cruise, follow or brake according to situation of a front vehicle detected by a millimeter wave radar, so that an occurrence of vehicle accident can be avoided or mitigated.

However, the existing ACC system implemented by using millimeter-wave radars cannot recognize traffic signal lights (referred to as traffic lights hereinafter), so that when the driver has a mental stress or is inattentive, a probability that a driving behavior of the driver violates the traffic lights is very high, and a traffic accident is extremely prone to occur.

SUMMARY

In view of this, an objective of the present disclosure is to propose an adaptive cruise control (Adaptive Cruise Control, ACC) system supporting traffic light recognition, which aims to solve a problem that the existing ACC system cannot recognize traffic lights.

In order to achieve this objective, the technical solutions of the present disclosure are implemented in this manner:
an adaptive cruise control system supporting traffic light recognition is provided, the adaptive cruise control system includes:
a wireless receiver adaptive with a wireless transmitter of each traffic light on a current lane, and configured to receive first traffic light state information about the traffic light on the lane sent by the wireless transmitter; and a main controller being in communication with the wireless receiver and configured to obtain the first traffic light state information received from the wireless receiver, and perform a stop control or adaptive cruise control on a vehicle based on the first traffic light state information.

Furthermore, the adaptive cruise control system further includes: a camera being in communication with the main controller and configured to obtain second traffic light state information about the traffic light on the current lane, and send the second traffic light state information to the main controller; where the main controller is further configured to perform the stop control or the adaptive cruise control on the vehicle based on the second traffic light state information.

Furthermore, the main controller includes a selector, a brake controller and an adaptive cruise control controller, where the selector is configured to determine to activate the brake controller or the adaptive cruise control controller according to the first traffic light state information or the second traffic light state information; the brake controller is configured to perform a stop control strategy on the vehicle during operation; and the adaptive cruise control controller is configured to perform an adaptive cruise control strategy on the vehicle during operation.

Furthermore, the selector includes:
a first signal processor configured to determine a color of a traffic light lit up currently according to the first traffic light state information, and determine to activate the brake controller or the adaptive cruise control controller according to different colors of traffic lights by performing steps of:
determining, when the traffic light lit up currently is a green light, an estimated time during which a current vehicle moves to a target stop line and a remaining time during which the green light is changed to a yellow light according to the first traffic light state information, and activating the brake controller if the determined remaining time during which the green light is changed to the yellow light is shorter than the determined estimated time during which the current vehicle moves from its current position to the target stop line; or activating the adaptive cruise control controller if the determined remaining time during which the green light is changed to the yellow light is longer than or equal to the determined estimated time;
determining, when the traffic light lit up currently is the yellow light, a yellow light warning manner according to the first traffic light state information, activating the brake controller if the yellow light warning manner is a short-time yellow light warning manner, or activating the adaptive cruise control controller if the yellow light warning manner is a long-time yellow light warning manner; and
determining, when the traffic light lit up currently is a red light, the estimated time during which the current vehicle moves from its current position to the target stop line and a remaining time during which the red light is changed to the green light according to the first traffic light state information; activating the brake controller if the remaining time during which the current red light is changed to the green light is longer than the determined estimated time during which the vehicle moves from its current position to the target stop line; or activating the adaptive cruise control controller if the remaining time during which the current red light is changed to the green light is shorter than or equal to the determined estimated time during which the vehicle moves from its current position to the target stop line.

Furthermore, the selector includes a second signal processor configured to determine a color of the traffic light lit up currently according to the second traffic light state information, and determine to activate the brake controller or the adaptive cruise control controller according to the traffic lights of different colors by performing steps of:

determining a light change condition according to the second traffic light state information when the traffic light lit up currently is the green light, activating the brake controller when determining that the green light is changed to the yellow light, or activating the adaptive cruise control controller when determining that the green light is continuously lit up;

determining the light change condition according to the second traffic light state information when the traffic light lit up currently is the yellow light, activating the brake controller when determining that the yellow light is changed to a red light, or activating the adaptive cruise control controller when determining that the yellow light is continuously yellow; and determining, when the traffic light lit up currently is the red light, a type of the traffic light according to the second traffic light state information and obtaining a state of a right turn signal lamp of the vehicle and an indication direction of a ground guide arrow; activating, if the traffic light is a cylindrical traffic light, the brake controller if the right turn signal lamp of the vehicle is not switched on or activating the adaptive cruise control controller if the right turn signal lamp of the vehicle is switched on; activating, if the traffic light is an arrow-shaped traffic light, the brake controller if the ground guide arrow is consistent with the indication direction of the arrow-shaped traffic light, or activating the adaptive cruise control controller if the ground guide arrow is inconsistent with the indication direction of the arrow-shaped traffic light.

Furthermore, the first traffic light state information and the second traffic light state information are configured with the same content or different contents.

Furthermore, the main controller is a main control unit of a millimeter wave radar of the adaptive cruise control system.

Furthermore, the adaptive cruise control system further includes one or more from a group consisting of: a perceptual component configured to transmit vehicle movement information to the main controller; an indicating instrument configured to prompt a driver to stop the vehicle when the main controller determines to activate the brake controller; and an engine configured to perform a torque control on the vehicle to stop the vehicle when the main controller determines to activate the brake controller; and an ESP control unit configured to perform a deceleration control on the vehicle to stop the vehicle when the main controller determines to activate the brake controller.

Compared with the prior art, the adaptive cruise system supporting traffic light recognition has the following advantages: in the present disclosure, a wireless receiver adaptive with the wireless transmitter of the traffic light is additionally provided to obtain traffic light state information, and an adaptive cruise control avoided from violating traffic signal lights is further realized based on the obtained traffic light state information, the existing adaptive cruise control system is optimized and upgraded, a development of the advanced driving assistance system of autonomous vehicle towards the practical direction can be promoted, a driving safety of the driver is improved, a driving behavior of the driver is standardized, the number of traffic accidents is reduced, personnel injury and property loss caused due to vehicle accidents are reduced, and technical support is provided for later higher level city automatic driving and intelligent transportation.

Another objective of the present disclosure is to provide an adaptive cruise control method supporting traffic light recognition and seeking to solve the problem that the existing ACC system cannot recognize traffic lights.

In order to achieve this objective, the technical solution of the present disclosure is realized in this way:

an adaptive cruise control method supporting traffic light recognition is provided, this method includes: obtaining first traffic light state information about a traffic light on a current lane which is received by a wireless receiver of a vehicle, where the wireless receiver is adaptive with a wireless transmitter of the traffic light on the current lane and is configured to receive the first traffic light state information sent from the wireless transmitter; and performing a stop control or an adaptive cruise control on the vehicle based on the first traffic light state information.

Furthermore, said performing the stop control or the adaptive cruise control on the vehicle based on the first traffic light state information includes: determining a color of a traffic light lit up currently; determining, when the traffic light lit up currently is determined as a green light, an estimated time during which the vehicle moves from its current position to a target stop line and a remaining time during which the green light is changed to a yellow light according to the first traffic light state information, and performing a stop control strategy if the determined remaining time during which the current green light is changed to the yellow light is shorter than the determined estimated time during which the current vehicle moves from its current position to the target stop line; or performing an adaptive cruise control strategy if the determined remaining time during which the current green light is changed to the yellow light is longer than or equal to the determined estimated time; determining, when the traffic light lit up currently is the yellow light, a yellow light warning manner according to the first traffic light state information, activating the stop control strategy if the yellow light warning manner is determined as a short-time yellow light warning manner, or performing the adaptive cruise control strategy if the yellow light warning manner is determined as a long-time yellow light warning manner; and determining, when the traffic light lit up currently is a red light, the estimated time during which the current vehicle moves from its current position to the target stop line and a remaining time during which the current red light is changed to the green light according to the first traffic light state information; performing the stop control strategy if the remaining time during which the current red light is changed to the green light is longer than the determined estimated time during which the current vehicle moves from its current position to the target stop line; or performing the adaptive cruise control strategy if the remaining time during which the current red light is changed to the green light is shorter than or equal to the determined estimated time during which the current vehicle moves from its current position to the target stop line.

Furthermore, the adaptive cruise control method further includes: obtaining second traffic light state information about the traffic light on the current lane collected by a camera of the vehicle; and performing a stop control or an adaptive cruise control on the vehicle based on the second traffic light state information.

Furthermore, said performing the stop control or the adaptive cruise control based on the second traffic light state information includes: determining a color of the traffic light lit up currently according to the second traffic light state information;

determining, when the traffic light lit up currently is the green light, a light change condition according to the second traffic light state information, performing the stop control strategy when the green light is changed to a yellow light, or performing the adaptive cruise control strategy when the green light is continuously lit up;

determining, when the traffic light lit up currently is the yellow light, the light change condition according to the second traffic light state information, performing the stop control strategy when determining that the yellow light is changed to a red light, or performing the adaptive cruise control strategy when determining that the yellow light is continuously lit up; and determining a type of the traffic light according to the second traffic light state information when the traffic light lit up currently is the red light, and obtaining a state of a right turn signal lamp of the vehicle and an indication direction of a ground guide arrow; performing, if the traffic light is a cylindrical traffic light, the stop control strategy if the right turn signal lamp of the vehicle is not switched on or performing the adaptive cruise control strategy if the right turn signal lamp of the vehicle is switched on; performing, if the traffic light is an arrow-shaped traffic light, the stop control strategy if the ground guide arrow is consistent with the indication direction of the arrow-shaped traffic light, or performing the adaptive cruise control strategy if the ground guide arrow is inconsistent with the indication direction of the arrow-shaped traffic light.

Furthermore, the first traffic light state information and the second traffic light state information are configured with the same content or different contents.

The aforesaid adaptive cruise control method and the adaptive cruise control system have the same advantages over the prior art, so that the advantages of the adaptive cruise control method are not repeatedly described herein.

Another objective of the present disclosure is to propose a non-transitory computer readable storage medium which aims to solve the problem that the existing adaptive cruise control system cannot recognize traffic lights.

In order to achieve this objective, the technical solution of the present disclosure is implemented in this way:

A computer-readable storage medium which stores a computer program, that, when executed by a processor of a computer, causes the processor of the computer to implement the aforesaid adaptive cruise control method.

The machine-readable storage medium and the adaptive cruise control system have the same advantages over the prior art, so that the advantages of the machine-readable storage medium are not repeatedly described herein.

Some other features and advantages involved in the present disclosure will be described in detail in the following detailed description of the embodiment.

BRIEF DESCRIPTION OF DRAWINGS

The accompanying figures which are constituted as a part of the present disclosure are used to provide further interpretation of the present disclosure, the schematic embodiments and the explanations of the embodiments are intended to explain the present disclosure and should not be constituted as undeserved limitation to the present disclosure. In the figures.

Figure 1:
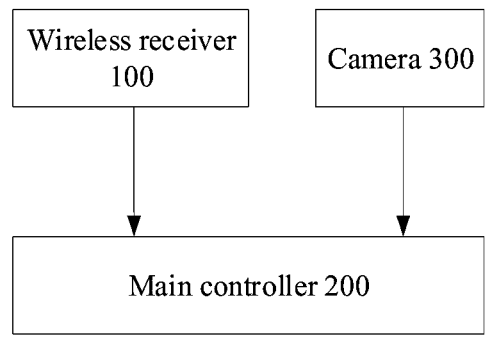
FIG. 1 is a schematic structural diagram of an adaptive cruise control system supporting traffic light recognition according to one embodiment of the present disclosure.

Reference numerals are listed below:
  100—wireless receiver; 200—main controller; 300—camera; 400—perception component; 500—indicating instrument; 600—engine; 700—ESP;
  210—selector; 220—vehicle brake controller; 230—adaptive cruise control controller;
  211—first signal processor; 212—second signal processor.

DESCRIPTION OF EMBODIMENTS

It needs to be noted that, embodiments in the present disclosure and the features in the embodiments can be combined without conflict.

In addition, the adaptive cruise control mentioned in the embodiments of the present disclosure, that is, ACC, refers to a technology that allows a driver to autonomously drive a vehicle while keeping a safe distance from the front vehicle, ACC detects condition of a vehicle in the front based on a millimeter wave radar, and usually appears as three situations during driving of the vehicle, and the three conditions are as follows: situation 1) a cruise mode, in the cruise mode, when there is no other vehicle in the front of the lane, ACC system controls the current vehicle to move at a preset speed; situation 2) a following mode, in the following mode, when there are other vehicles moving in the front of the lane, if a moving speed of the front vehicle is shorter than the preset speed of the current vehicle, the ACC system controls the current vehicle to keep a preset safe distance away from the front vehicle, and follow the front vehicle at a speed as same as the front vehicle; situation 3) a braking mode, in the braking mode, when the distance between the current vehicle and the front vehicle is less than the preset safe vehicle distance, the ACC system determines whether to perform deceleration control through a braking system or an engine control system to enable the current vehicle to have the safe distance away from the front vehicle all the time. In addition, the traffic lights mentioned in the embodiments of the present disclosure refer to red light and green light, the red light and the green light may be used interchangeably.

The present disclosure will be described in detail below with reference to the accompanying drawings and in combination with the embodiments.

FIG. 1 is a schematic structural diagram of an adaptive cruise control system supporting traffic light recognition according to one embodiment of the present disclosure. As shown in FIG. 1, the adaptive cruise control system may include: a wireless receiver 100 adapted with a wireless transmitter (not shown in the figures) of each traffic light on the current lane and configured to receive the first traffic light state information about the traffic light on the current lane and sent by the wireless transmitter; and a main controller 200 being in communication with the wireless receiver 100 and configured to obtain the first traffic light state information received by the wireless receiver, and perform a stop control or an adaptive cruise control based on the first traffic light state information.

The traffic light needs to be configured with a transceiver for wireless communication, that is, the traffic light should have a wireless transmitter, and the wireless transmitter of the traffic light may communicate with a controller of the traffic light, and the controller of the traffic light is configured to detect and obtain the first traffic light state information in real time, and send the first traffic light state information through the wireless transmitter. The wireless receiver 100 of the vehicle is adapted with the wireless transmitter of the traffic light, and may receive the first traffic light state information sent by the wireless transmitter within a preset range of distance. Where the first traffic light state information may include a color of the traffic light, a lighting state of the traffic light, a remaining time of changing of the traffic light, a yellow light warning manner (e.g., a short-time yellow light warning or a long-time yellow light warning), etc. In addition, the controller of the traffic light may also use a monitoring device installed with the traffic light to obtain information such as a distance from the position of current vehicle to a target stop line, and integrate these information together in the first traffic light state information.

In a preferable embodiment, the adaptive cruise control system may further include: a camera 300 which is in communication with the main controller 200 and is configured to obtain second traffic light state information about the traffic light on the current lane, and send the second traffic light state information to the master controller 200. Where the main controller 200 is further configured to perform vehicle stop control or adaptive cruise control based on the second traffic light state information.

It should be noted that, the first traffic light state information and the second traffic light state information are the same type of traffic light state information, herein, "the first" and "the second" indicate that the traffic light state information has two different sources, that is, the traffic light state information is derived from the wireless receiver 100 and the camera 300, respectively. However, the second traffic light state information is obtained the camera 300 by performing image processing, the content of the second traffic light state information obtained by the camera 300 may be different from the first traffic light state information since cameras have different image performances. For example, most cameras cannot accurately recognize the remaining time of conversion of traffic light, thus, the second traffic light state information may not include the remaining time of conversion of traffic light. However, generally, the second traffic light state information may include a color of traffic light, a lighting state of traffic light, a type of traffic light (e.g., a cylindrical traffic light or an arrow-shaped traffic light), a yellow light warning manner (a short-time yellow light warning manner or a long-time yellow light warning manner), light change condition (e.g., changing from a green light to a yellow light, or a continuous green light), etc. In addition, the camera 300 may be further configured to recognize a ground traffic identifier (e.g., a ground guide arrow), therefore, in some embodiments, the second traffic light state information may further include information about the ground traffic identifier. Accordingly, it should be noted that, the contents of the first traffic light state information and the second traffic light state information may be different according to specific control strategy, and the contents of the first traffic light state information and the second traffic light state information will be described below with reference to examples, the details are not repeatedly described herein.

Figure 2:
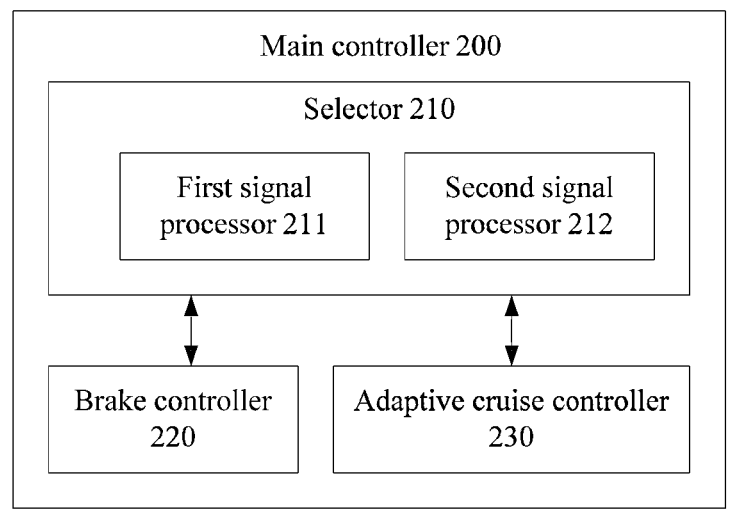
FIG. 2 is a preferable schematic structural diagram of a main controller according to one embodiment of the present disclosure.

FIG. 2 is a schematic preferable block diagram of a main controller 200 according to one embodiment of the present disclosure. As shown in FIG. 2, the main controller 200 may include a selector 210, a brake controller 220, and an adaptive cruise control controller 230. Where the selector 210 is configured to determine to activate the brake controller 220 or the adaptive cruise control controller 230 according to the first traffic light state information or the second traffic light state information; the brake controller 220 is configured to perform a stop control strategy on the vehicle when it is activated; and the adaptive cruise control controller 230 is configured to perform an adaptive cruise control strategy on the vehicle when it is activated.

Where said performing, by the brake controller 220, the stop control strategy on the vehicle when the brake controller 220 is activated may include: determining a target stop line; and automatically determining a time point of starting to brake the vehicle based on the determined target stop line; sending a deceleration request to a vehicle stability program (Vehicle Stability Program, ESP) control unit of the vehicle when the brake controller 220 starts to brake the vehicle. After the vehicle is braked and stopped by the ESP control unit, the selector 210 continues to be performed. Where the target stop line may include two kinds of stop lines, that is, a conventional stop line (i.e., stop line specified by traffic regulations) and a zebra crossing, when there is a vehicle ahead of a conventional stop line or a zebra crossing, this vehicle is taken as the target stop line; when there is no any vehicle ahead of the conventional stop line or the zebra crossing, one line (i.e., a preset value, such as 2 meters) which is ahead of the conventional stop line or the zebra crossing and has X meters distance from the conventional stop line or the zebra crossing is taken as the target line; in a determination process, the conventional stop line is prioritized over the zebra crossing.

Where when the adaptive cruise control controller 230 is activated, vehicle's adaptive cruise control strategy performed by the adaptive cruise control controller 230 may include the cruise mode, the following mode, and the braking mode, these modes specifically include: 1) controlling the current vehicle to move according to a preset speed when there is no front vehicle on the current lane; 2) if a moving speed of the front vehicle is shorter than the preset speed of the current vehicle on the current lane, controlling, there is a front vehicle on the current lane, enable the current vehicle to keep the current vehicle a preset safe distance from the front vehicle, and enable the front vehicle to move at a speed as same as that of the front vehicle; 3) when a distance between the current vehicle and the front vehicle is shorter than the preset safe distance, performing deceleration control on the current vehicle through the ESP or the engine so as to keep the vehicle the safe distance from the front vehicle all the time.

In addition, the control strategies corresponding to the brake controller 220 and the adaptive cruise control controller 230 may further include prompting the driver to take control of vehicle driving so as to manually intervene the vehicle driving.

Further, according to different sources of the first traffic light state information and the second traffic light state information, the selector 210 may be configured to include a first signal processor 211 and a second signal processor 212, so that the first signal processor 211 and the second signal processor 212 select the brake controller 220 and the adaptive cruise control controller 230 to perform the corresponding vehicle stop control strategy and the corresponding adaptive cruise control strategy, respectively.

In particular, regarding the first signal processor 211, the first signal processor 211 is configured to determine the color of the traffic light lit up currently according to the first traffic light state information, and determine to activate the brake controller 220 or the adaptive cruise control controller 230 according to different colors of traffic lights, determination of activation of the brake controller 220 or the adaptive cruise control controller 230 includes: determining, when the traffic light lit up currently is a green light, an estimated time during which the current vehicle moves from its current position to the target stop line and a remaining time during which the current green light is changed to the yellow light according to the first traffic light state information, activating the brake controller 220 if the determined remaining time during which the green light is changed to the yellow light is shorter than the determined estimated time; or activating the adaptive cruise control controller 230 if the determined remaining time during which the green light is changed to the yellow light is longer than or equal to the determined estimated time; determining, when the traffic light lit up currently is a yellow light, a yellow light warning manner according to the first traffic light state information, activating the brake controller 220 if the yellow light warning manner is a short-time yellow light warning manner, or activating the adaptive cruise control controller 230 if the yellow light warning manner is a long-time yellow light warning manner; and determining, when the traffic light lit up currently is a red light, the estimated time during which the current vehicle moves from its current position to the target stop line and a remaining time during which the current red light is changed to the green light according to the first traffic light state information, and activating the brake controller 220 if the remaining time during which the current red light is changed to the green light is longer than the determined estimated time during which the current vehicle moves from its current position to the target stop line; or activating the adaptive cruise control controller 230 if the remaining time during which the current red light is changed to the green light is shorter than or equal to the determined estimated time during which the current vehicle moves from its current position to the target stop line.

Figure 3:
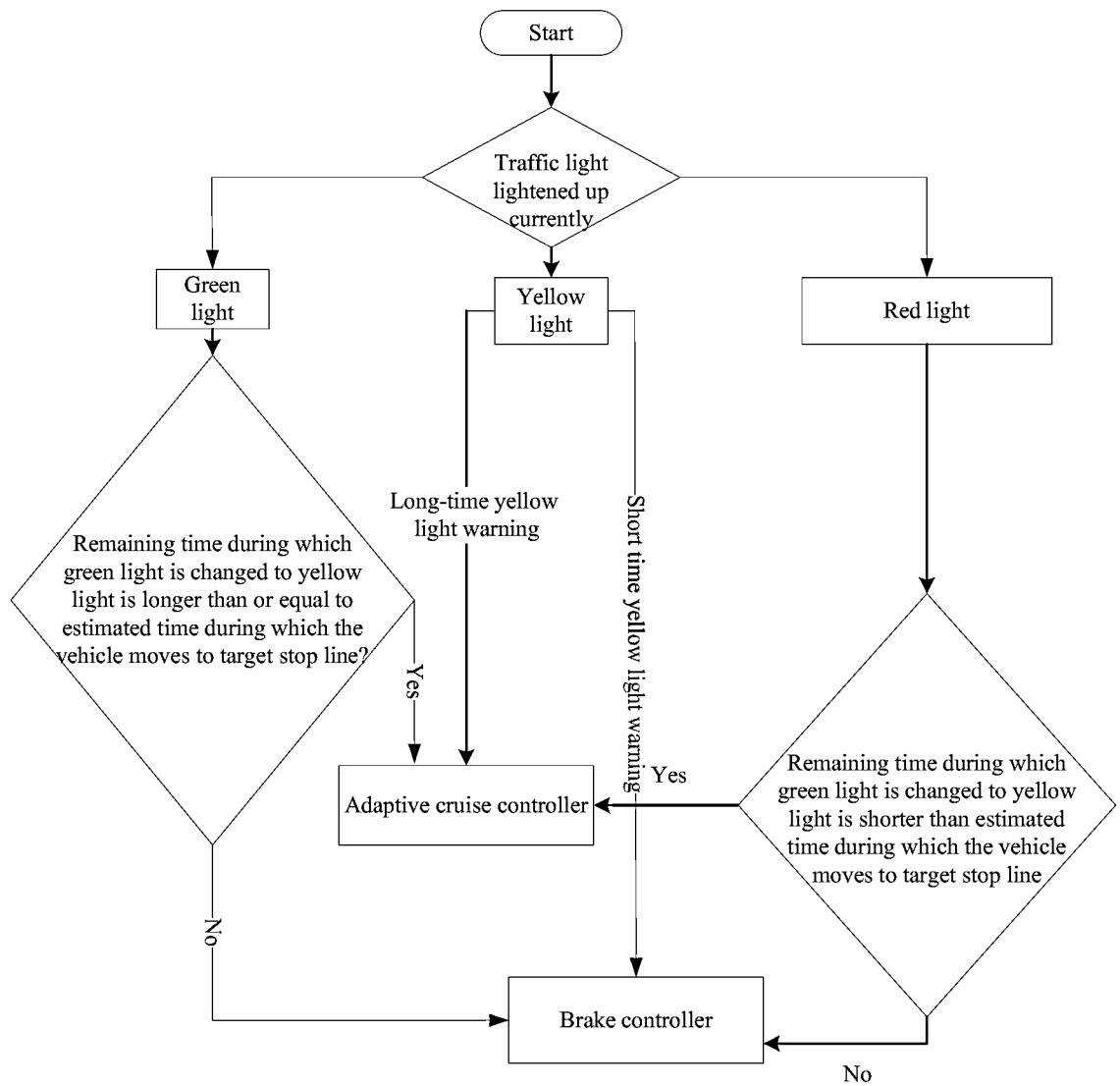
FIG. 3 is a schematic flowchart of an example of controlling a vehicle based on state information of a first traffic light from a wireless receiver according to one embodiment of the present disclosure.

For example, FIG. 3 is a schematic flowchart of an example of performing vehicle control based on the first traffic light state information derived from a wireless receiver in one embodiment of the present disclosure. As shown in FIG. 3, in this example, the first signal processor 211 is configured to classify and process the colors of the traffic lights illuminated on the current lane according to the indication of the first traffic light state information received by the wireless receiver 100, if the lane on which the vehicle is driving is left turn lane/straight lane, left turn lane/straight lane/right lane, straight lane/right lane, the first signal processor 211 is configured to determine the driver's intention according to information such as turn signal lamps of the current vehicle, and make a logical judgment according to the state of traffic light corresponding to the driver's intention, and the logical judgement includes:

Condition one, a green light is lit up currently, the first signal processor 211 obtains an estimated time during which the current vehicle moves from its current position to the target stop line by dividing the distance between the position of the current vehicle and the target stop line by an average vehicle speed of the current vehicle, if the remaining time during which the green light is changed to the yellow light is shorter than the estimated time during which the current vehicle moves from its current position to the target stop line, the ACC system activates the brake controller 220, if the remaining time during which the green light is changed to the yellow light is longer than or equal to the estimated time during which the current vehicle moves from its current position to the target stop line, the ACC system activates the adaptive cruise control controller 230.

Condition two, a yellow light is lit up currently, the first signal processor 211 determines classification of warning manner of the yellow light according to a long-time yellow light warning manner or a short-time yellow light warning manner of the yellow light, if the short-time yellow light warning manner of the yellow light is determined, the ACC system activates the brake controller 220; if the long-time yellow light warning manner of the yellow light is determined, the adaptive cruise control controller 230 is activated.

Condition three, a red light is lit up currently, the first signal processor 211 obtains the estimated time during which the current vehicle moves from its current position to the target stop line by dividing the distance between the position of the current vehicle and the target stop line by the average vehicle speed of the current vehicle, if the remaining time during which the red light is changed to the green light is longer than the estimated time during which the current vehicle moves from its current position to the target stop line, the ACC system activates the brake controller 220; if the remaining time during which the red light is changed to the green light is shorter than or equal to the estimated time during which the current vehicle moves from its current position to the target stop line, the adaptive cruise control controller 230 is activated.

Furthermore, regarding the second signal processor 212, the second signal processor 212 is configured to determine the color of the traffic light lit up currently according to the second traffic light state information, and determine to activate the brake controller 220 or the adaptive cruise control controller 230 according to the traffic lights of different colors, the process of activating the brake controller 220 or the adaptive cruise control controller 230 by the second signal processor 212 according to the traffic lights of different colors includes: determining, when the traffic light lit up currently is a green light, a light change condition according to the second traffic light state information, activating the brake controller 220 when determining that the green light is changed to the yellow light, or activating the adaptive cruise control controller 230 when the green light is continuously lit up; determining, when the yellow light is continuously lit up, the light change condition according to the second traffic light state information, and activating the brake controller 220 when determining that the yellow light is changed to the red light; and determining, when the traffic light lit up currently is the red light, a type of the traffic light according to the second traffic light state information, and obtaining a state of a right turn signal lamp of the vehicle and an indication direction of a ground guide arrow; when the traffic light is a cylindrical traffic light, activating the brake controller 220 if the right turn signal lamp of the vehicle is not switched on; activating the adaptive cruise control controller 230 if the right turn signal lamp of the vehicle is switched on; when the traffic light is an arrow-shaped traffic light, activated the brake controller 230 if the ground guide arrow and an indication direction of the arrow-shaped traffic light are consistent; activating the adaptive cruise control controller if the ground guide arrow and an indication direction of the arrow-shaped traffic light are inconsistent. Where the main controller 200 may obtain the state of the right turn signal lamp of the vehicle in real time through CAN bus of the vehicle, and the camera 300 may obtain the indication direction of the ground guide arrow through image photographing and image recognition, moreover, the camera 300 may integrate information about the indication direction of the ground guide arrow into the second traffic light state information.

Figure 4:
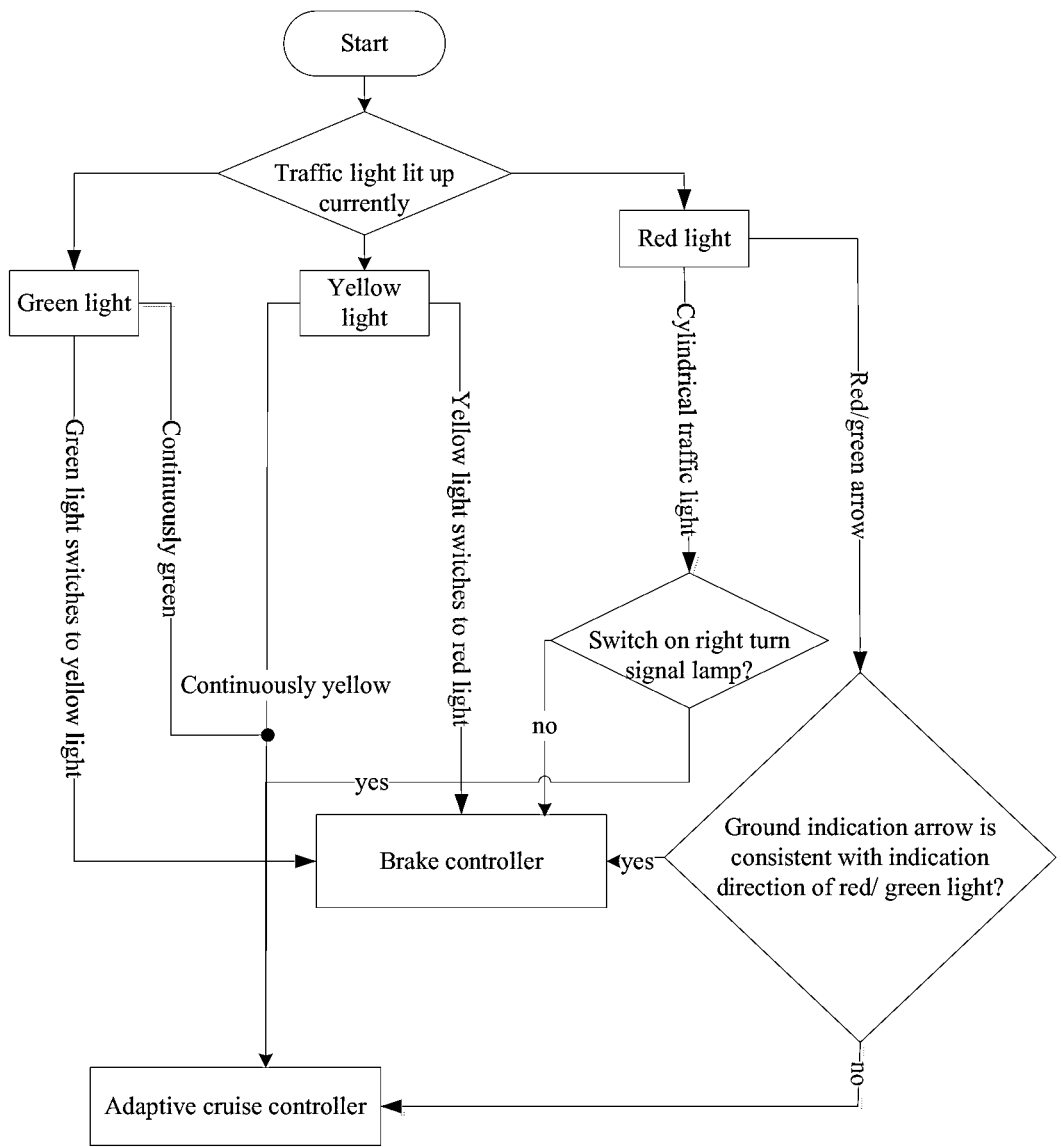
FIG. 4 is a schematic flowchart of an example of controlling a vehicle based on state information of a second traffic light from a camera according to one embodiment of the present disclosure.

For example, FIG. 4 is a schematic flowchart of an example of performing vehicle control based on the second traffic light state information derived from a camera in another embodiment of the present disclosure. In this example, due to the limitation of the image recognition capability of the camera 200, the second traffic light state information may not include the remaining time of color change of traffic light. As shown in FIG. 4, in this example, the second signal processor 212 performs classification and processing on the state of the traffic light on the current lane indicated by the second traffic light state information which is received from the camera 300, if the lane on which the vehicle is moving is a left turn/straight lane, left turn/ straight/right turn lane and straight/right turn lane, the second signal processor 212 determines the driver's intention according to information such as the turn signal lamp of the current vehicle, and performs a logical judgment according to the state of the traffic light corresponding to the driver's intention.

Condition one, the traffic light lit up currently is the green light, when the second signal processor 212 determines that the green light is changed to the yellow light according to the second traffic light state information, the ACC system activates the brake controller 220; when the second signal processor 212 determines that the green light is continuously lit up, the adaptive cruise control controller 230 is activated.

Condition two, the traffic light lit up currently is the yellow light, when the second signal processor 212 determines that the yellow light is changed to the red light according to the second traffic light state information, the ACC system activates the brake controller 220; when the second signal processor 212 determines that the yellow light is continuously lit up, the adaptive cruise control controller 230 is activated.

Condition three, the traffic light lit up currently is the red light, the second signal processor 212 determines the type of the traffic light according to the second traffic light state, and uses different control strategies according to different types of traffic lights, if the driver does not switch on the right turn signal lamp, the ACC system activates the brake controller 220, if the driver switches on the right turn signal lamp, the adaptive cruise control controller 230 is activated; if the ground guide arrow and the indication direction of the traffic light are consistent, the ACC system activates the brake controller 220; if the ground guide arrow and the indication direction of the traffic light are inconsistent, the adaptive cruise control controller 230 is activated. In this condition, different types of traffic lights are considered, the type of the traffic light corresponding to the current lane can be intelligently recognized, and a special control strategy is applied to the cylindrical traffic light, and a guarantee of safe driving is provided for the driver while safety is ensured right turn is more preferable under the guarantee of safety.

It can be seen from the examples in FIG. 3 and FIG. 4 that, different types of traffic lights and traffic conditions of complex crossroads are considered in the embodiments of the present disclosure, whether the vehicle is allowed to pass a road according to the ground traffic signs and changes of traffic lights, and the like. If the vehicle is not allowed to pass the road, the vehicle brake may be stopped at the target stop line or the driver is notified of taking control of the vehicle, so that a driving behavior violating the traffic light is avoided, traffic accidents are greatly reduced, and safety of driving is ensured.

Figure 5:
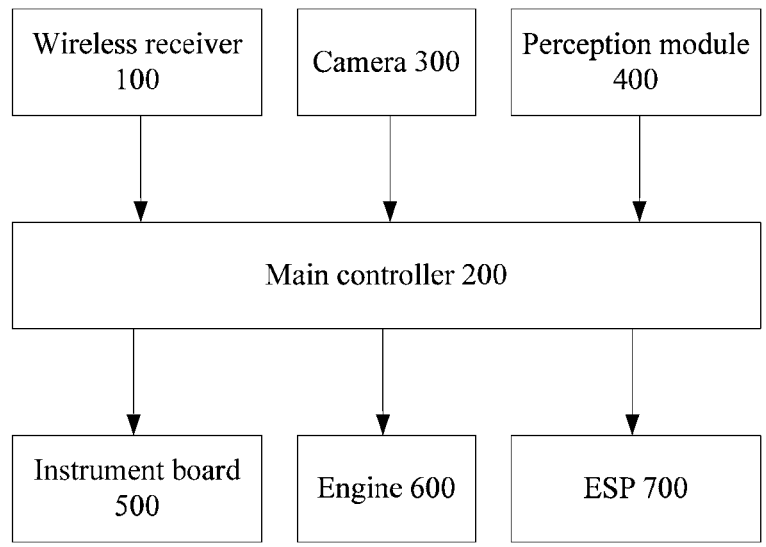
FIG. 5 is a schematic block diagram of a preferable adaptive cruise control system according to one embodiment of the present disclosure.

According to the examples corresponding to FIG. 3 and FIG. 4, in addition to obtaining traffic light state information, the main controller 200 also needs to obtain information such as the current average vehicle speed, a turn signal and the like in some scenarios, and these information can be collected by the corresponding perceptual components and are transmitted to the main controller 200 through a CAN bus. On this basis, FIG. 5 is a schematic structural diagram of a preferable adaptive cruise control system according to one embodiment of the present disclosure. Referring to FIG. 5, in one preferable embodiment, the adaptive cruise control system may further include a perceptual component 400, the perceptual component includes such as instrument and meter such as a rotating speed meter, a turn signal lamp, a wheel speed sensor, a steering angle sensor, a yaw angle sensor and the like, and the perceptual component is configured to transmit related vehicle driving information to the main controller 200 in order that the main controller 200 determines an average vehicle speed, a vehicle direction, and the like.

Furthermore, in order to cooperate with the operation of the brake controller 220 and the adaptive cruise control controller 230, a preferable adaptive cruise control system may further include an instrument 500 for prompting, an engine 600, and an electronic stability program (Electronic Stability Program, ESP) 700, where, for example, the indicating instrument 500 is configured to prompt the driver to stop when the main controller 200 determines to activate the brake controller 220; for example, when the main controller 200 determines to activate the brake controller 220, the engine 600 and the ESP 700 are configured to perform torque control and deceleration control to stop the vehicle.

Further, the main controller 200 may be directly configured as a main control unit of a millimeter-wave radar of the adaptive cruise control system. It is known that the currently existing adaptive cruise control systems are all configured with millimeter-wave radars, and each millimeter-wave radar has a main control unit, and the main control unit is mainly used for realizing vehicle acceleration control and vehicle deceleration control and the like in adaptive cruise control process, and has very powerful data processing capability. Therefore, as compared to additionally configuring one main controller 200, the main control unit of the millimeter-wave radar is directly used as the main controller 200, conservation of cost of components is facilitated, and it only needs to perform fewer program configurations on the main control unit of the millimeter-wave radar which has been adapted to the adaptive cruise control of the vehicle, which is prone to be implemented.

Figure 6:
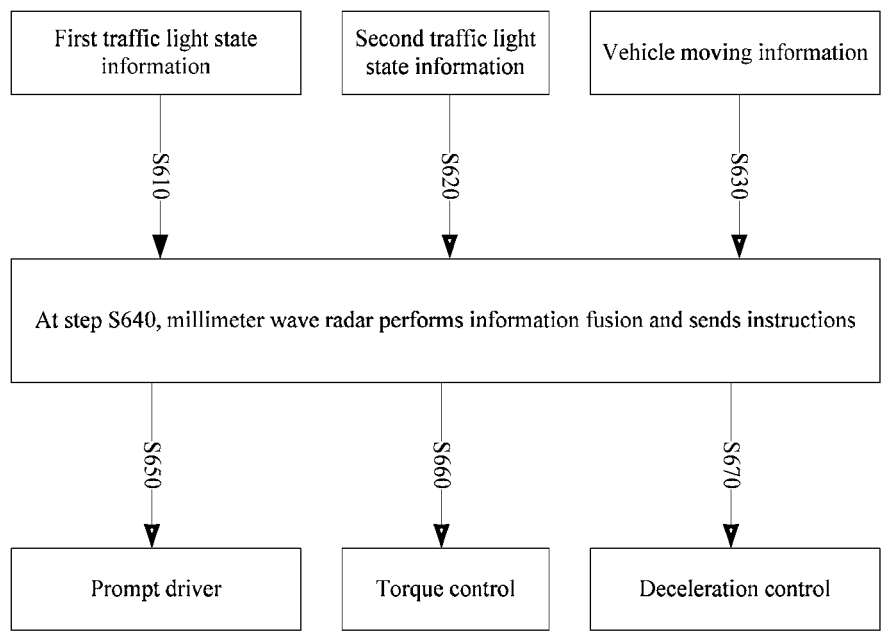
FIG. 6 is a schematic diagram of signal transmission of an application example of a preferable adaptive cruise control system according to one embodiment of the present disclosure.

On the basis of FIG. 5, FIG. 6 is a schematic diagram of signal transmission of an application example of the preferred adaptive cruise control system according to one embodiment of the present disclosure, in this application example, the main controller 200 is configured as the main control unit of the millimeter wave radar, therefore, the main controller 200 is directly referred to as the millimeter wave radar. As shown in FIG. 6, the corresponding signal transmission process mainly includes the following steps:

At step S610, the wireless receiver 100 receives the first traffic light state information indicating the traffic light state (the lighting state and the color of the traffic light) of the current lane, the remaining time of switching between red light and green light, and the distance from the position of the current vehicle to the target stop line, which is fed back by the wireless transmitter of the traffic light;

At step S620, the camera 300 installed at the rear view mirror on the upper portion of the front windshield of the vehicle uses image processing technology to identify the front ground guide arrows, ground stop lines, zebra crossings, traffic lights, lane lines, targets, etc., so as to obtain the second traffic light state information, and input the second traffic light state information to the millimeter wave radar through the CAN bus of the vehicle.

At step S630, the perceptual component 400 of the vehicle inputs vehicle driving information such as vehicle speed (e.g., the real vehicle speed, the vehicle speed displayed on the instrument board), steering angle, angular velocity of the steering angle, lateral accelerated speed, longitudinal accelerated speed, turn signal, brake pedal signal, accelerator pedal signal to the millimeter-wave radar through the CAN bus of the vehicle;

At step S640, the millimeter-wave radar receives the information from the camera 300 and various perception components 400 and performing fusion processing on the information, and sends a corresponding deceleration instruction to the ESP 700, sends an engine torque command to the engine 600, and sends the related alarm information for prompting and a command to the indicating instrument 500.

At step S650, the indicating instrument 500 prompts the driver in response to the command of the millimeter wave radar.

At step S660, the engine 600 performs torque control in response to the command of the millimeter wave radar.

At step S670, the ESP 700 performs deceleration control in response to the command of the millimeter wave radar.

It should be noted that, a conventional ACC system is provided with millimeter-wave radar, camera 300, perception component 400, indicating instrument 500, engine 600, and ESP 700. It can be understood that these components can be shared with other functional systems of the vehicle. Thus, according to this application example, it can be seen that the technical solutions of the embodiment of the present disclosure can be implemented by only additionally configuring one wireless receiver 100 adapted to the wireless transmitter of the traffic light, that is, an architecture of one millimeter-wave radar plus one wireless receiver is adopted to implement adaptive cruise control of traffic signal lamps. In addition, this architecture may further include one camera, because the camera also has a traffic light recognition function, thus, the embodiment of the present disclosure is also applicable to traffic lights without a wireless communication transceiver.

Accordingly, the adaptive cruise control system in the embodiment of the present disclosure is optimized and upgraded as compared to the existing ACC system, the adaptive cruise control system can promote the advanced driving assistance system of autonomous vehicle to develop towards practical direction, improves the driving safety of the driver, standardizes the driving behavior of the driver, reduces the number of traffic accidents, reduces personnel injury and property loss due to vehicle accidents, and provides technical support for later higher-level urban autonomous driving and intelligent transportation.

Here, it also needs to be noted that, the main controller 200 may include a processor and a memory, the selector, the brake controller, the adaptive cruise control controller and the sub-modules of the adaptive cruise control controller may be stored in the memory as program units, and the processor executes the program units stored in the memory so as to implement corresponding functions. The processor includes a kernel, and the kernel is configured to call a corresponding program unit in the memory. There may be one or more than one kernels, a data transmission method is performed by adjusting kernel parameters. The memory may include a non-transitory memory, a random access memory (Random Access Memory, RAM), and/or a non-volatile memory in a computer-readable medium, and the non-volatile memory may be such as a read-only memory (Read Only Memory, ROM) or a flash RAM, and the memory includes at least one memory chip.

Figure 7:
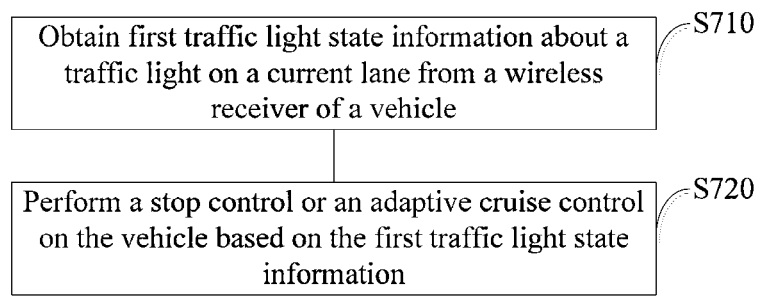
FIG. 7 is a schematic flowchart of an adaptive cruise control method supporting traffic light recognition according to another embodiment of the present disclosure.

FIG. 7 is a schematic flowchart of an adaptive cruise control method supporting traffic light recognition according to another embodiment of the present disclosure, the adaptive cruise control method is based on the same inventive idea as the adaptive cruise control system in the aforesaid embodiments. As shown in FIG. 7, this adaptive cruise control method may include the following steps:

At step S710, obtain first traffic light state information about a traffic light on the current lane received by a wireless receiver of a vehicle.

The wireless receiver is adapted with a wireless transmitter of the traffic light and is configured to receive the first traffic light state information sent by the wireless transmitter, regarding the specific details of information interaction between the wireless receiver and the traffic light, reference can be made to the aforesaid embodiments regarding the adaptive cruise control system, and the details are not repeatedly described herein.

At step S720, a stop control or an adaptive cruise control is performed on the vehicle based on the first traffic light state information.

In one preferable embodiment, the step S720 may further include:

step S721, determining a color of the traffic light lit up currently according to the first traffic light state information.

step S722, determining, when the traffic light lit up currently is a green light, an estimated time during which the current vehicle moves to a target stop line and a remaining time during which the green light is changed to the yellow light according to the first traffic light state information, performing a stop control strategy if the determined remaining time during which the current green light is changed to the yellow light is shorter than the determined estimated time during which the current vehicle moves from its current position to the target stop line; or performing an adaptive cruise control strategy if the determined remaining time during which the current green light is changed to the yellow light is longer than or equal to the determined estimated time during which the current vehicle moves from its current position to the target stop line;

step S723, determining, when the traffic light lit up currently is a yellow light, a yellow light warning manner according to the first traffic light state information, and performing the stop control strategy if the yellow light warning manner is determined as a short-time yellow light warning manner; or performing the adaptive cruise control strategy if the yellow light warning manner is a long-time yellow light warning manner;

step S724, determining, when the traffic light lit up currently is a red light, the estimated time during which the current vehicle moves from its current position to the target stop line and a remaining time during which the red light is changed to the green light according to the first traffic light state information, and performing the stop control strategy if the determined remaining time during which the current red light is changed to the green light is longer than the determined estimated time; or performing the adaptive cruise control strategy is activated if the determined remaining time during which the current red light is changed to the green light is shorter than or equal to the determined estimated time.

In addition to the method of obtaining traffic light state information based on the wireless receiver in the step S710 and the step S720, in one preferable embodiment, the adaptive cruise control method may further include the following steps (not shown in FIG. 7):

step S730, obtaining second traffic light state information about the traffic lights on the current lane collected by a camera of the vehicle; and step S740, performing the stop control or the adaptive cruise control based on the second traffic light state information.

In one preferable embodiment, the step S740 may further include the following steps:

step 741, determining a color of the traffic light lit up currently according to the second traffic light state information;

step S742, determining, when the traffic light lit up currently is a green light, a light change condition according to the second traffic light state information, and performing a stop control strategy when it is determined that the green light is changed to a yellow light, or performing an adaptive cruise control strategy when the green light is continuously lit up;

step S743, determining, when the traffic light lit up currently is a yellow light, a light change condition according to the second traffic light state information, and performing the stop control strategy when it is determined that the yellow light is changed to a red light, or performing the adaptive cruise control strategy when the yellow light is continuously lit up.

step S744, determining the type of traffic light according to the second traffic light state information when the traffic light lit up currently is a red light, and obtaining the state of the right turn signal lamp of the vehicle and the indication direction of the ground guide arrow; when the traffic light is a cylindrical traffic light, performing the stop control strategy if the right turn signal lamp of the vehicle is not switched on; performing the adaptive cruise control strategy if the right turn signal lamp of the vehicle is switched on; when the traffic light is an arrow-shaped traffic light, performing the stop control strategy if the direction of the ground guide arrow is consistent with the indication direction of the arrow-shaped traffic light; or performing the adaptive cruise control strategy if the direction of the ground guide arrow is inconsistent with the indication direction of the arrow-shaped traffic light.

It should be noted that, regarding more implementation details and the effects of this adaptive cruise control method, reference can be made to the aforesaid embodiments regarding the adaptive cruise control system, and the details of this adaptive cruise control method are not repeatedly described herein.

A vehicle is further provided in one embodiment of the present disclosure, this vehicle may be provided with the adaptive cruise control system in the aforesaid embodiments.

A machine readable storage medium is further provided in one embodiment of the present disclosure, the machine readable storage medium stores an instruction that causes the machine to perform the adaptive cruise control method according to the aforesaid embodiments.

A computer program product is further provided in one embodiment of the present disclosure, when this computer program product is executed on a relevant component of the vehicle, this computer program product is suitable for performing initialization of the program including the method steps of the adaptive cruise control method in the aforesaid embodiments.

Figure 8:
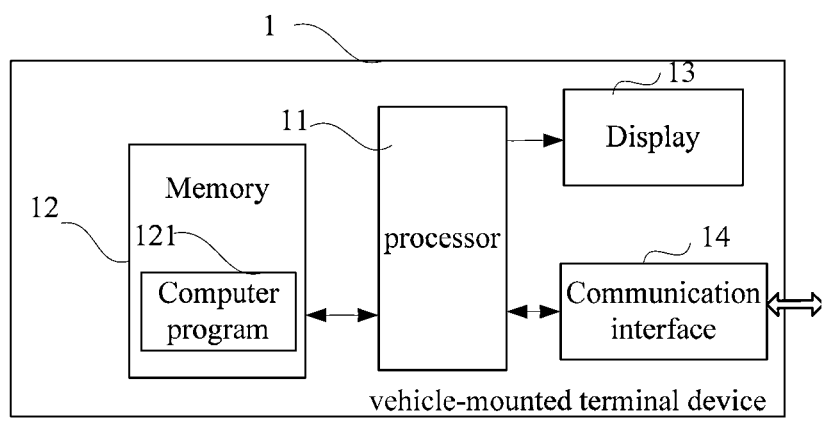
FIG. 8 is a schematic structural block diagram of a vehicle-mounted terminal device according to another embodiment of the present disclosure.

A vehicle-mounted terminal device 1 is further provided in one embodiment of the present disclosure, as shown in FIG. 8, the vehicle-mounted terminal device 1 includes a processor 11, a memory 12 that stores a computer program 121, a display 13 and a communication interface 14, when executing the computer program 121 in the memory 12, the processor 11 is configured to implement the adaptive cruise control method, including: obtaining, from a wireless receiver of a vehicle, first traffic light state information about a traffic light on a current lane, where the wireless receiver is adaptive with a wireless transmitter of the traffic light on the current lane and is configured to receive the first traffic light state information sent from the wireless transmitter; and performing a stop control or an adaptive cruise control on the vehicle based on the first traffic light state information.

Those skilled in the art should understand that the embodiments of the present disclosure may be provided as a method, a device, or a computer program product. Therefore, the present disclosure may be in the form of a complete hardware embodiment, a complete software embodiment, or an embodiment with the combination of software and hardware. Moreover, the present disclosure may take the form of a computer program product implemented on one or more computer readable storage medium which includes but is not limited to a magnetic disk memory, a compact disc read-only memory (Compact Disc Read Only Memory, CD-ROM), an optical memory that contain computer readable program code.

These computer program instructions may also be loaded into a computer or other programmable data processing device, such that a series of operational steps can be performed on a computer or other programmable device to produce a computer-implemented process, so that the instructions executed on the computer or other programmable device provide steps for implementing the functions specified in one or more processes of the flowchart and/or one or more blocks of the block diagram.

In a typical configuration, a vehicle-mounted terminal device 1 includes one or more processors (e.g., Central Processing Unit, CPU), input/output interfaces, network interfaces, and memory.

The memory may include a transitory memory, a random access memory (Random Access Memory, RAM), and/or a non-volatile memory in a computer-readable medium, such as a read-only memory (Read-only Memory, ROM) or a flash RAM. The memory is an example of a computer-readable medium.

The computer-readable medium includes non-transitory and transitory, removable and non-removable media that can be stored using any method or technology. The information may be computer-readable instructions, data structures, modules of a computer program, or other data. Examples of storage medium of a computer include but are not limited to, phase change RAM, a static random access memory (Static Random Access Memory, SRAM), dynamic random access memory (Dynamic Random Access Memory, DRAM), other types of RAM, ROM, electrically erasable programmable read only memory (Electrically Erasable Programmable Read Only Memory, EEPROM), flash memory or other memory technology, CD-ROM, digital video disc (Digital Video Disc, DVD), or other optical storage, magnetic cassettes, magnetic tape magnetic disk storage or other magnetic storage devices, or any other non-transmission medium, these storage mediums of the computer can be used to store information that can be accessed by the computing device.

It should also be noted that, terms such as "comprising", "including" or any other variation are intended to cover a non-exclusive inclusion, so that a process, a method, goods, or a device which includes a series of elements not only includes the elements, but also includes other elements that are not expressly listed, or includes the elements inherent to such process, method, goods, or device. Without more limitations, an element which is defined by a sentence "includes one . . . " does not exclude a presence of additional identical elements in the process, the method, the goods, and the device which include the elements.

The foregoing embodiments are only some preferable embodiments of the present disclosure, and should not be regarded as limitations to the present disclosure. All modifications, equivalent replacements, and improvements which are made within the spirit and the principle of the present disclosure should all be included in the protection scope of the present disclosure.

What is claimed is:

1. An adaptive cruise control system supporting traffic light recognition, comprising:
    a wireless receiver adaptive with a wireless transmitter of each traffic light on a current lane, and configured to receive first traffic light state information about the traffic light on the lane sent by the wireless transmitter; and
    a main controller being in communication with the wireless receiver and configured to obtain the first traffic light state information received from the wireless receiver and obtain information of a turn signal lamp of a vehicle through a perceptual component, and perform a stop control or adaptive cruise control on the vehicle based on the first traffic light state information and the information of the turn signal lamp;
    the adaptive cruise control system further comprises:
    a camera being in communication with the main controller and configured to obtain second traffic light state information about the traffic light on the current lane, and send the second traffic light state information to the main controller, wherein the camera is configured to obtain an indication direction of a ground guide arrow through image photographing and image recognition and integrate information about the indication direction of the ground guide arrow into the second traffic light state information;
    wherein the main controller is further configured to perform the stop control or the adaptive cruise control on the vehicle based on the second traffic light state information and the information of the turn signal lamp.

2. The adaptive cruise control system according to claim 1, wherein the main controller comprises a selector, a brake controller and an adaptive cruise control controller, wherein:
    the selector is configured to determine to activate the brake controller or the adaptive cruise control controller according to the first traffic light state information or the second traffic light state information;
    the brake controller is configured to perform a stop control strategy on the vehicle during operation; and
    the adaptive cruise control controller is configured to perform an adaptive cruise control strategy on the vehicle during operation.

3. The adaptive cruise control system according to claim 2, wherein the selector comprises:
    a first signal processor configured to determine a color of a traffic light lit up currently according to the first traffic light state information, and determine to activate the brake controller or the adaptive cruise control controller according to different colors of traffic lights by performing steps of:
    determining, when the traffic light lit up currently is a green light, an estimated time during which a current vehicle moves to a target stop line and a remaining time during which the green light is changed to a yellow light according to the first traffic light state information, and activating the brake controller if the determined remaining time during which the green light is changed to the yellow light is shorter than the determined estimated time during which the current vehicle moves from its current position to the target stop line; or activating the adaptive cruise control controller if the determined remaining time during which the green light is changed to the yellow light is longer than or equal to the determined estimated time;
    determining, when the traffic light lit up currently is a yellow light, a yellow light warning manner according to the first traffic light state information, activating the brake controller if the yellow light warning manner is a short-time yellow light warning manner, or activating the adaptive cruise control controller if the yellow light warning manner is a long-time yellow light warning manner; and
    determining, when the traffic light lit up currently is a red light, the estimated time during which the current vehicle moves from its current position to the target stop line and a remaining time during which the red light is changed to the green light according to the first traffic light state information; activating the brake controller if the remaining time during which the current red light is changed to the green light is longer than the determined estimated time during which the vehicle moves from its current position to the target stop line; or activating the adaptive cruise control controller if the remaining time during which the current red light is changed to the green light is shorter than or equal to the determined estimated time during which the vehicle moves from its current position to the target stop line; and/or the selector comprises a second signal processor configured to determine a color of the traffic light lit up currently according to the second traffic light state information, and determine to activate the brake controller or the adaptive cruise control controller according to the traffic lights of different colors by performing steps of:

determining a light change condition according to the second traffic light state information when the traffic light lit up currently is the green light, activating the brake controller when determining that the green light is changed to the yellow light, or activating the adaptive cruise control controller when determining that the green light is continuously lit up;

determining the light change condition according to the second traffic light state information when the traffic light lit up currently is the yellow light, activating the brake controller when determining that the yellow light is changed to a red light, or activating the adaptive cruise control controller when determining that the yellow light is continuously yellow; and determining a type of the traffic light according to the second traffic light state information when the traffic light lit up currently is the red light, and obtaining a state of a right turn signal lamp of the vehicle and an indication direction of a ground guide arrow; activating, if the traffic light is a cylindrical traffic light, the brake controller if the right turn signal lamp of the vehicle is not switched on or activating the adaptive cruise control controller if the right turn signal lamp of the vehicle is switched on; activating, if the traffic light is an arrow-shaped traffic light, the brake controller if the ground guide arrow is consistent with the indication direction of the arrow-shaped traffic light, or activating the adaptive cruise control controller if the ground guide arrow is inconsistent with the indication direction of the arrow-shaped traffic light.

4. The adaptive cruise control system according to claim 1, wherein the first traffic light state information and the second traffic light state information are configured with the same content or different contents.

5. The adaptive cruise control system according to claim 1, wherein the main controller is a main control unit of a millimeter wave radar of the adaptive cruise control system.

6. The adaptive cruise control system according to claim 1, further comprising one or more from a group consisting of:

a perceptual component configured to transmit vehicle movement information to the main controller;

an indicating instrument configured to prompt a driver to stop the vehicle when the main controller determines to activate the brake controller; and an engine configured to perform a torque control on the vehicle to stop the vehicle when the main controller determines to activate the brake controller; and an ESP control unit configured to perform a deceleration control on the vehicle to stop the vehicle when the main controller determines to activate the brake controller.

7. An adaptive cruise control method supporting traffic light recognition, comprising:

obtaining, from a wireless receiver of a vehicle, first traffic light state information about a traffic light on a current lane and obtaining information of a turn signal lamp of a vehicle through a perceptual component, wherein the wireless receiver is adaptive with a wireless transmitter of the traffic light on the current lane and is configured to receive the first traffic light state information sent from the wireless transmitter; and performing a stop control or an adaptive cruise control on the vehicle based on the first traffic light state information and information of the turn signal lamp of the vehicle;

the adaptive cruise control method further comprises:

obtaining second traffic light state information about the traffic light on the current lane collected by a camera of the vehicle, wherein the camera is configured to obtain an indication direction of a ground guide arrow through image photographing and image recognition and integrate information about the indication direction of the ground guide arrow into the second traffic light state information; and performing the stop control or the adaptive cruise control on the vehicle based on the second traffic light state information and the information of the turn signal lamp of the vehicle.

8. The adaptive cruise control method according to claim 7, wherein said performing the stop control or the adaptive cruise control on the vehicle based on the first traffic light state information comprises:

determining a color of a traffic light lit up currently;

determining, when the traffic light lit up currently is determined as a green light, an estimated time during which the vehicle moves from its current position to a target stop line and a remaining time during which the green light is changed to a yellow light according to the first traffic light state information, and performing a stop control strategy if the determined remaining time during which the current green light is changed to the yellow light is shorter than the determined estimated time during which the current vehicle moves from its current position to the target stop line; or performing an adaptive cruise control strategy if the determined remaining time during which the current green light is changed to the yellow light is longer than or equal to the determined estimated time;

determining, when the traffic light lit up currently is the yellow light, a yellow light warning manner according to the first traffic light state information, activating the stop control strategy if the yellow light warning manner is determined as a short-time yellow light warning manner, or performing the adaptive cruise control strategy if the yellow light warning manner is determined as a long-time yellow light warning manner; and determining, when the traffic light lit up currently is the red light, the estimated time during which the current vehicle moves from its current position to the target stop line and a remaining time during which the red light is changed to the green light according to the first traffic light state information; performing the stop control strategy if the remaining time during which the red light is changed to the green light is longer than the determined estimated time during which the current vehicle moves from its current position to the target stop line; or performing the adaptive cruise control strategy if the remaining time during which the red light is changed to the green light is shorter than or equal to the determined estimated time during which the current vehicle moves from its current position to the target stop line.

9. The adaptive cruise control method according to claim 7, wherein said performing the stop control or the adaptive cruise control based on the second traffic light state information comprises:
  determining a color of the traffic light lit up currently according to the second traffic light state information;
  determining, when the traffic light lit up currently is the green light, a light change condition according to the second traffic light state information, performing the stop control strategy when the green light is changed to a yellow light, or performing the adaptive cruise control strategy when the green light is continuously lit up;
  determining, when the traffic light lit up currently is the yellow light, the light change condition according to the second traffic light state information, performing the stop control strategy when determining that the yellow light is changed to a red light, or performing the adaptive cruise control strategy when determining that the yellow light is continuously lit up; and
  determining, when the traffic light lit up currently is the red light, a type of the traffic light according to the second traffic light state information, and obtaining a state of a right turn signal lamp of the vehicle and an indication direction of a ground guide arrow; performing, if the traffic light is a cylindrical traffic light, the stop control strategy if the right turn signal lamp of the vehicle is not switched on or performing the adaptive cruise control strategy if the right turn signal lamp of the vehicle is switched on; performing, if the traffic light is an arrow-shaped traffic light, the stop control strategy if the ground guide arrow is consistent with the indication direction of the arrow-shaped traffic light, or performing the adaptive cruise control strategy if the ground guide arrow is inconsistent with the indication direction of the arrow-shaped traffic light.

10. The adaptive cruise control method according to claim 7, wherein the first traffic light state information and the second traffic light state information are configured with the same content or different contents.

11. A non-transitory computer-readable storage medium which stores a computer program, that, when executed by a processor of the computer, causes the processor of the computer to implement an adaptive cruise control method, comprising:
  obtaining, from a wireless receiver of a vehicle, first traffic light state information about a traffic light on a current lane and obtaining information of a turn signal lamp of a vehicle through a perceptual component, wherein the wireless receiver is adaptive with a wireless transmitter of the traffic light on the current lane and is configured to receive the first traffic light state information sent from the wireless transmitter;
  performing a stop control or an adaptive cruise control on the vehicle based on the first traffic light state information and the information of the turn signal lamp;
  obtaining second traffic light state information about the traffic light on the current lane collected by a camera of the vehicle, wherein the camera is configured to obtain an indication direction of a ground guide arrow through image photographing and image recognition and integrate information about the indication direction of the ground guide arrow into the second traffic light state information; and
  performing the stop control or the adaptive cruise control on the vehicle based on the second traffic light state information and the information of the turn signal lamp.

\* \* \* \* \*